(12) United States Patent
Ono

(10) Patent No.: US 8,780,450 B2
(45) Date of Patent: Jul. 15, 2014

(54) LENS APPARATUS AND IMAGE CAPTURING APPARATUS

(71) Applicant: FUJIFILM Corporation, Tokyo (JP)

(72) Inventor: Shuji Ono, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 125 days.

(21) Appl. No.: 13/664,968

(22) Filed: Oct. 31, 2012

(65) Prior Publication Data

US 2013/0057963 A1    Mar. 7, 2013

Related U.S. Application Data

(63) Continuation of application No. PCT/JP2011/002850, filed on May 23, 2011.

(30) Foreign Application Priority Data

May 27, 2010    (JP) .................................. 2010-122082

(51) Int. Cl.
*G02B 3/12*    (2006.01)
*G02B 1/06*    (2006.01)
*G02B 26/02*    (2006.01)
*G02B 26/00*    (2006.01)
*G02B 3/14*    (2006.01)

(52) U.S. Cl.
CPC ...... *G02B 3/14* (2013.01); *G02B 26/02* (2013.01); *G02B 26/004* (2013.01)
USPC .......................................... 359/666; 359/665

(58) Field of Classification Search
CPC ................................. G02B 3/14; G02B 26/004
USPC ..................................................... 359/665, 666
See application file for complete search history.

(56) References Cited

FOREIGN PATENT DOCUMENTS

| JP | 2009-047717 | 3/2009 |
|---|---|---|
| JP | 2009-527795 | 7/2009 |
| JP | 2009-217249 | 9/2009 |

OTHER PUBLICATIONS

International Preliminary Report on Patentability PCT/JP2011/002850 dated Dec. 13, 2012.
Written Opinion of the International Searching Authority PCT/JP2001/002850 dated Aug. 23, 2011.
International Search Report PCT/JP2011/002850 dated Aug. 23, 2011, with English Translation.

*Primary Examiner* — William Choi
(74) *Attorney, Agent, or Firm* — Young & Thompson

(57) ABSTRACT

Provided is a lens apparatus in which a plurality of lenses are formed, including: a housing filled with a first liquid and a second liquid that do not mix with each other; a partition to divide the inside of the housing into a plurality of regions, each of the regions being filled with one of the first liquid and the second liquid; and a pressure control section that controls the internal pressure of the region filled with the first liquid, where the partition is provided with a plurality of openings, in which a plurality of lenses having different characteristics from each other are formed by the interface between the first liquid and the second liquid, and the regions inside the housing filled with the first liquid are linked to each other so that the first liquid can move therebetween.

20 Claims, 11 Drawing Sheets

LENS APPARATUS AND IMAGE CAPTURING APPARATUS

The contents of the following patent applications are incorporated herein by reference:

Japanese patent application NO. 2010-122082 filed on May 27, 2010 and

International Patent Application NO. PCT/JP2011/002850 filed on May 23, 2011.

BACKGROUND

1. Technical Field

The present invention relates to a lens apparatus and an image capturing apparatus.

2. Description of the Related Art

Recently, a varifocal lens using its liquid interface as a refractive surface has been getting attentions, as disclosed in Patent Documents No. 1 and No. 2. This type of lens realizes a variable focus by shaping, as you desire, the interface between two liquids that do not mix with each other by application of pressure. The operation of the interface between these two liquids is preformed by controlling the amount of liquids flown into the aperture formed on the container. In an example, the curvature of the lens can be changed by increasing or decreasing the amount of fluids flown into the lens. The focal length changes according to the change in curvature of the lens.

Patent Document No. 1: Japanese Patent Application Publication No. 2009-217249

Patent Document No. 2: Japanese Patent Application Publication No. 2009-527795

SUMMARY

In a conventional liquid lens which uses a mixture of two liquids, the characteristics of the lens can be controlled by controlling the pressure of one liquid. By the way, so as to widen the depth of field, some image capturing systems adopt a lens array made up of lenses having respectively different characteristics. However if the aforementioned lenses controlled by pressure are used to form the lens array, the image capturing system would have to include many pressure controlling apparatuses corresponding to the number of lenses, which is likely to increase the size of the apparatus.

So as to solve the stated problems, according to a first aspect of the innovations herein, provided is a lens apparatus in which a plurality of lenses are formed, including: a housing filled with a first liquid and a second liquid that do not mix with each other; a partition to divide the inside of the housing into a plurality of regions, each of the regions being filled with one of the first liquid and the second liquid; and a pressure control section that controls the internal pressure of the region filled with the first liquid, where the partition is provided with a plurality of openings, in which a plurality of lenses having different characteristics from each other are formed by means of the interface between the first liquid and the second liquid, and the regions inside the housing filled with the first liquid are linked to each other so that the first liquid can move therebetween.

The summary of the invention does not necessarily describe all necessary features of the present invention. The present invention may also be a sub-combination of the features described above.

DESCRIPTION OF EXEMPLARY EMBODIMENTS

The invention will now be described based on the preferred embodiments, which do not intend to limit the scope of the present invention, but exemplify the invention. All of the features and the combinations thereof described in the embodiment are not necessarily essential to the invention.

Figure 1:
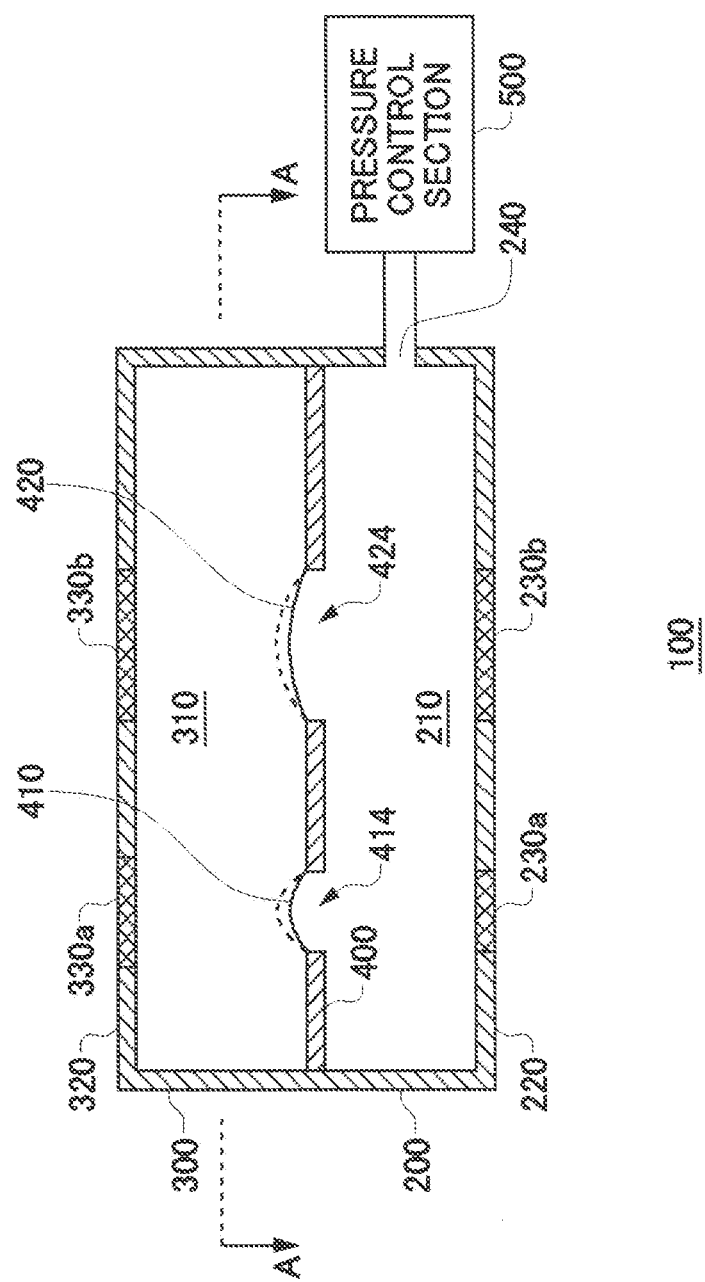
FIG. 1 is a sectional view of a lens apparatus 100 according to the first embodiment.

FIG. 1 is a sectional view of a lens apparatus 100 according to the first embodiment. The lens apparatus 100 includes a housing 200, a plurality of chambers 210, 310 included inside the housing 200, and a partition 400 to separate the inside space of the housing 200 into a plurality of chambers 210, 310.

The housing 200 is filled with a first liquid and a second liquid that do not mix with each other. The first liquid and the second liquid are in contact with each other through the opening provided through the partition 400, and form a liquid lens by means of the interface between the two liquids. The housing 200 is provided with a window 330 and a window 230 for transmitting light. The window 330 and the window 230 are provided in correspondence with the liquid lens formed inside the housing 200.

The window 330 and the window 230 in this example are respectively provided on opposing surfaces of the housing 200. As shown in FIG. 1, a plurality of sets of window 330 and window 230 may be provided (e.g., a set of window 330a and window 230a, and a set of window 330b and window 230b).

The housing 200 includes an exterior wall provided with the window 330 and an exterior wall provided with the window 230. The housing 200 in this particular example includes a first exterior wall 300, a second exterior wall 320 which is a top plate, and a third exterior wall 220 which is a bottom plate. The second exterior wall 320 and the third exterior wall 220 are provided to be parallel to each other. The second exterior wall 320 and the third exterior wall 220 may have the same shape.

The first exterior wall 300 is provided to seal the space between the second exterior wall 320 and the third exterior wall 220. The first exterior wall 300 is in a tube-like form having its top covered with the second exterior wall 320, and its bottom covered with the third exterior wall 220. In an example, the first exterior wall 300 is a quadrangular tube and the second exterior wall 320 and the third exterior wall 220 are provided as the upper surface and the lower surface of the quadrangular tube. In this case, the housing 200 has a shape of a box.

Each exterior wall may be made of glass, ceramic, and polymer. As mentioned above, the second exterior wall 320 includes windows 330a, 330b that transmit light. The third exterior wall 220 includes windows 230a, 230b that transmit light. The windows 230a, 230b, 330a, and 330b may be made of transparent glass, for example. The entire second exterior wall 320 and third exterior wall 220 may be made of transparent glass, resin, or the like.

The partition 400 separates the inside space of the housing 200 into a plurality of regions, each of which is filed with either a first liquid or a second liquid. Among these regions, those filled with the same liquid will be linked to each other to allow movement of the liquid thereamong. The concept of linking a plurality of regions filled with the same liquid includes a case that a single field is filled with the same liquid.

The partition 400 in this example is used to separate the inside space of the housing 200 into a single region to be filled with the first liquid (chamber 210) and a single region to be filled with the second liquid (chamber 310). The chamber 310 is provided closer to the second exterior wall 320, and the chamber 210 is provided closer to the third exterior wall 220.

The partition 400 may be provided to be parallel to the second exterior wall 320 and the third exterior wall 220. The partition 400 in this example is provided between the second exterior wall 320 and the third exterior wall 220, to be parallel to them. The purpose of the partition 400 is to move through the openings 414, 424, and not to move the liquid between the chamber 210 and the chamber 310. In other words, the partition 400 is in tight contact with the inner surface of the first exterior wall 300. The partition 400 has the same exterior shape as the sectional shape resulting when the region surrounded by the first exterior wall 300 is cut at a plane parallel to the second exterior wall 320 and the third exterior wall 220.

The plurality of chambers 210, 310 are respectively filled with liquids of different characteristics from each other. The liquid in the chamber 210 is referred to as the first liquid, and the liquid in the chamber 310 is referred to as the second liquid. The first liquid and the second liquid are materials not mixing with each other (e.g., water and oil). For example, the first liquid and the second liquid may be PDMS (poly-dimethyl-siloxane) and pure water. Moreover, the refractive index of the first liquid is different from the refractive index of the second liquid. In an example, the refractive index of the second liquid may be smaller than the refractive index of the first liquid.

Moreover, the density of the first liquid may desirably be substantially equal to the density of the second liquid. The second liquid may be an aqueous solution in which a predetermined substance is dissolved. In this case, by adjusting the amount of substance dissolved in the second liquid, the density of the first liquid can be substantially equalized with the density of the second liquid.

The partition 400 has a plurality of openings therethrough. The following takes an example in which the partition has two openings 414, 424. However, the number of openings is not limited to this. The openings 414, 424 penetrate the partition 400, to bring the first liquid in contact with the second liquid.

The first liquid will contact the second liquid through the openings 414, 424, thereby forming the liquid interface. The liquid interface for the openings 414, 424 will have a lens shape due to the internal pressure difference between the chamber 210 and the chamber 310 as well as the surface tension of the liquid at the rim of the openings 414, 424. As a result, the liquid lens functioning as a varifocal lens using its liquid interface as a refractive surface is formed on the interface at which the first liquid is in contact with the second liquid.

The shape of the openings 414, 424 at which they open (opening shape) may be round, elliptical, square, or rectangular, which can depend on the shape of the liquid lens to be formed. In addition, each of the openings 414, 424 is formed on a straight line connecting the window 330 and the window 230 corresponding to it. The area and the shape of each of the window 330 and the window 230 are determined according to the area and the shape of the opening 414, 424 corresponding to it.

The openings 414, 424 form liquid lenses having respectively different lens characteristics. The lens characteristics are the shape of the lens surface, the curvature of the lens surface, the focal length, and the like. For example, the two openings 414, 424 have different areas from each other. In the present example, the opening 414 is smaller in area where it opens than the opening 424. For example, the opening 414 may have a smaller dimension than the opening 424. Here, the dimension of an opening is defined to be the distance between two points of the opening. When there are two openings of similar shapes but different sizes, the two points of each opening correspond in position to the other. For example if the opening is round, the dimension is the diameter. If the opening is a square, the dimension may be the length of a diagonal line. In this example, the opening 414 has a smaller diameter than the opening 424. If this is the case, the first liquid lens 410 formed in the opening 414 will have a larger curvature than the second liquid lens 420 formed in the opening 424.

By raising the pressure of the liquid in the chamber 210, the surface of each liquid lens will be convex in the upward direction from the surface of the partition 400 that is closer to the chamber 310, so as to match the pressure difference of the liquids to the surface tension. However, in this case, the volume that can be occupied by the second liquid decreases. Therefore, the internal pressure of the second liquid may increase. The external wall of the chamber 310 may be at least partially elastic, so as to enlarge the internal region in the chamber 310 in response to the increase in internal pressure of the second liquid. The elastic region may be on the first external wall 300.

By gradually decreasing the pressure of the liquid filled in the chamber 210, the curvature of each liquid lens will gradually decrease, and so the lens surface changes from the dotted line to the solid line in FIG. 1. Eventually, the lens surface will be substantially parallel to the surface of the partition 400 that is closer to the chamber 310.

By further decreasing the pressure of the liquid filled in the chamber 210, the interface between the first liquid and the second liquid moves towards the surface of the partition 400 that is closer to the chamber 210. By further decreasing the pressure of the liquid in the chamber 210 after the interface has reached the surface of the partition 400 that is closer to the chamber 210, each liquid lens will be convex in the downward direction from the surface of the partition 400 that is closer to the chamber 210, so as to match the pressure difference of the liquids to the surface tension.

Because the opening 424 in this example has a larger bore than the opening 414, the height of the lens is lower than the height of the first liquid lens 410. Here, the height of the lens is defined as the distance from the rim of the opening of the partition to the vertex of the convex shape of the lens. In other words, the height of the lens is inversely related to the diameter of the opening.

The pressure control section 500 for controlling the pressure of the liquid is connected to one of the plurality of chambers 210, 310. In this example, the pressure control section 500 is connected to the chamber 210 via the opening 240 provided through the first exterior wall 300. The pressure control section 500 may control the internal pressure of the chamber 210, either by supplying the first liquid to the chamber 210 via the opening 240 or removing the first liquid from the chamber 210. The pressure control section 500 may control the internal pressure of the chamber 210 by inserting and removing solid matter to and from the chamber 210 via the opening 240. The solid matter is insoluble to the first liquid.

In this example, the curvatures of the plurality of liquid lenses 410, 420 having respectively different lens characteristics can be controlled simultaneously, by controlling the pressure of the liquid in the single chamber 210. Therefore, the lens characteristics of the plurality of liquid lenses can be easily and swiftly changed without any complex structure.

Figure 2:
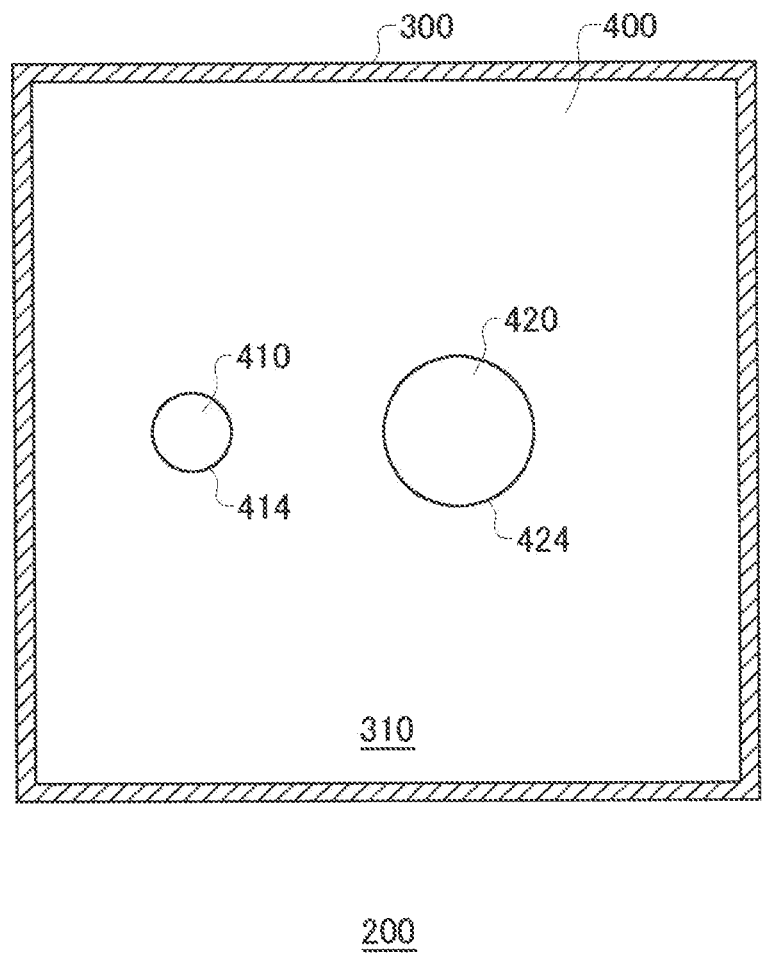
FIG. 2 is an A-A sectional view of the lens apparatus 100 according to the first embodiment.

FIG. 2 is an A-A sectional view of the housing 200. In this example, the housing 200 has a square partition 400 formed along the first exterior wall 300 which is in the shape of a square frame. However, the shape of the partition 400 is not limited to a square. An opening 414 and an opening 424 are provided through the partition 400.

The opening 414 is provided with a first liquid lens 410. The opening 424 is provided with a second liquid lens 420. The liquid lenses 410, 420 may be round convex lenses respectively having different bores. In this example, there are two openings in the partition 400. However, the present invention may adopt an array of openings respectively different in size and shape.

The area of each opening formed through the partition 400 may be determined according to its distance from the opening 240. For example, the areas of the openings 240 formed through the partition 400 may gradually increase or gradually decrease according to their distances from the opening 240. In this case, the openings may have similar shapes to each other.

The areas of the openings formed as an array in the partition 400 may be determined according to their distances from the center of the array. For example, the opening formed in the partition 400 may gradually increase or gradually decrease according to their distances from the center of the array. In this case, the openings may have similar shapes to each other.

The openings formed through the partition 400 may be formed with a certain interval therebetween, and the interval may depend on the areas of the openings. For example, as the areas of the openings get larger, the distances thereamong may be set larger.

Figure 3:
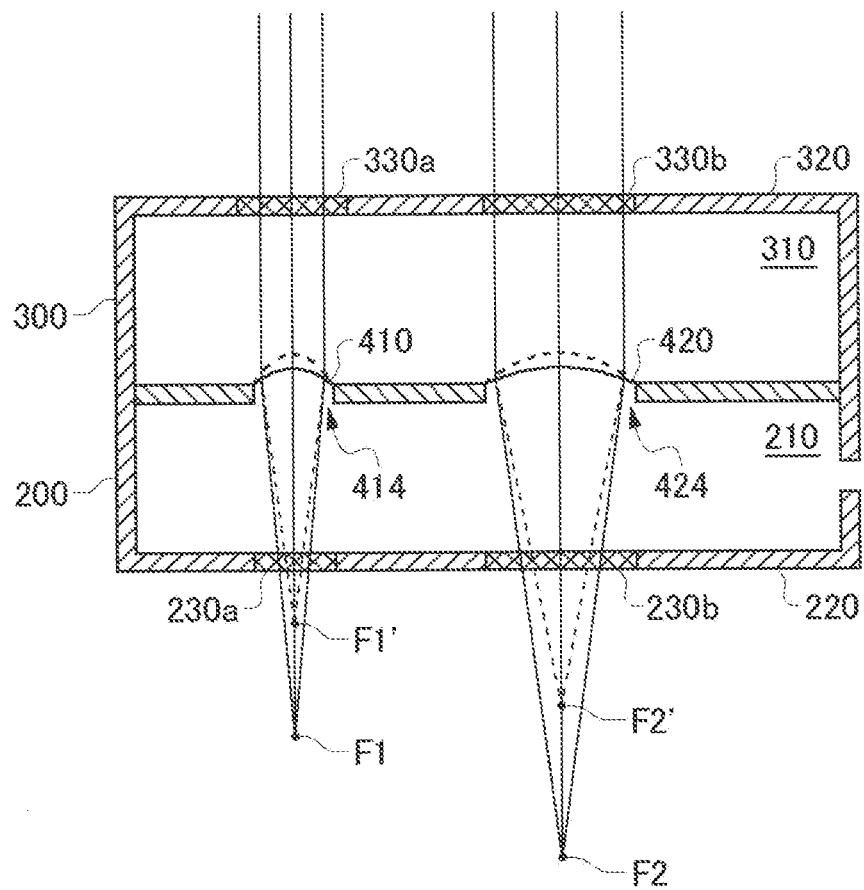
FIG. 3 shows an exemplary optical path of the lens apparatus 100 according to the first embodiment.

FIG. 3 shows an exemplary optical path of the lens apparatus 100 according to the present embodiment.

The light having passed through the window 330a provided for the second exterior wall 320 travels in the second liquid filled in the chamber 310, to be refracted by the first liquid lens 410 formed on the interface between the first liquid and the second liquid. It further travels in the first liquid filled in the second chamber 210, passes through the window 230a provided for the third exterior wall 220, to make focus at the focal point F1.

The light having passed through the window 330b provided for the second exterior wall 320 travels in the second liquid filled in the chamber 310, to be refracted by the second liquid lens 420 formed on the interface between the first liquid and the second liquid. It further travels in the first liquid filled in the second chamber 210, passes through the window 230b provided for the third exterior wall 220, to make focus at the focal point F2.

When the pressure of the liquid in the chamber 210 is raised by the pressure control section 500, the shapes of the interfaces of the liquid lenses 410, 420 change, to create the liquid lenses respectively shown by the dotted lines. The focal lengths of the liquid lenses change as shown by the dotted lines.

As a result, the light traveling in the second liquid after passing through the window 330a is refracted by the liquid lens 412, travels in the first liquid, passes through the window 230a, to make focus at the focal position F1' which is closer to the light source than F1. Likewise, the light traveling in the second liquid after passing through the window 330b is refracted by the liquid lens 422, travels through the first liquid, passes through the window 230b, and makes focus at the focal position F2' which is closer to the light source than F2. In this way, the focal lengths of the liquid lenses having different bores from each other can be simultaneously controlled by operating the pressure control section 500.

Figure 4:
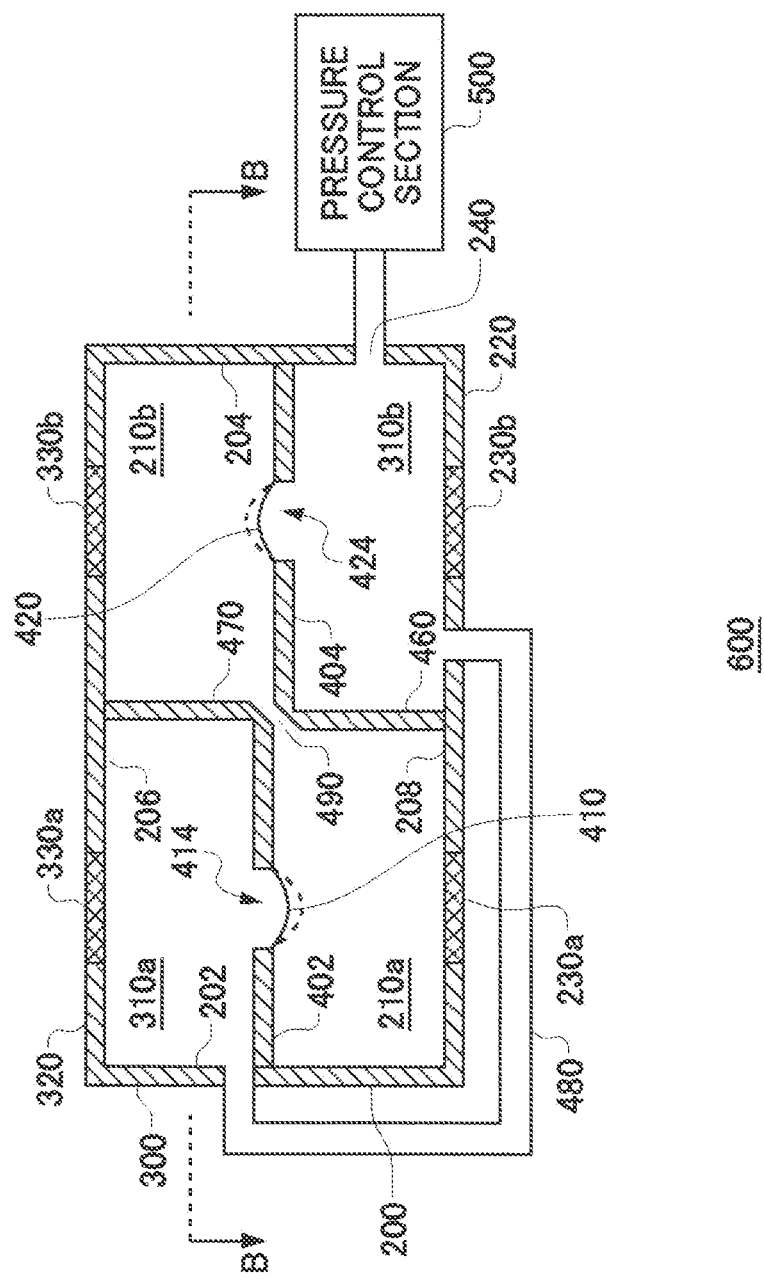
FIG. 4 is a sectional view of a lens apparatus 600 according to the second embodiment.

FIG. 4 is a sectional view of a lens apparatus 600 according to the second embodiment. The members having the same function as those of the first embodiment are assigned the same reference numerals, and their explanation is omitted in the following. The partitions 402, 404, 460, 470 of the lens apparatus 600 in the present example separate the inside of the housing 200 into four small chambers 210a, 210b, 310a, and 310b.

The partitions 402, 404, 460, 470 in the present example halve the inside of the housing 200 in both of the horizontal direction and the vertical direction. Note that in the specification, "the horizontal direction and the vertical direction" mean the two directions orthogonal to each other, and not the direction in reference to the ground, the earth, or the like.

The partition 402 and the partition 404 halve the inside of the housing 200 in the vertical direction. The partition 402 and the partition 404 may be provided in position similar to the partition 400 explained with reference to FIG. 1. There is a clearance 490 formed between the partition 402 and the partition 404. The clearance 490 may be provided in the substantial center in the horizontal direction.

The partitions 460, 470 halve the inside of the housing 200 in the horizontal direction. The partitions 460, 470 are provided from the second exterior wall 320 to the third exterior wall 220. The partitions 460, 470 may be located in a substantially horizontal center of the housing 200. The partitions 460, 470 may be provided as two plates as shown in FIG. 4. There is a clearance 490 formed between the partition 460 and the partition 470. The clearance 490 may be provided to divide the partition 460 and the partition 470 as two equal parts in the vertical direction. Note that the partition 460 and the partition 470 may be coupled in a part of the clearance 490.

The first small chamber 210a is provided to be adjacent to the chamber 310 in a first direction. Here, "first direction" is the direction that goes from the third inner wall 206 to the fourth inner wall 208. In this example, the first small chamber 210a is provided to be adjacent to the third small chamber 310a in the first direction.

The second small chamber 210b is provided to be adjacent to the chamber 310 in a second direction that is different from the first direction. Here, "second direction" is the direction that goes from the fourth inner wall 208 to the third inner wall. In this example, the second small chamber 210b is provided to be adjacent to the fourth small chamber 310b in the second direction.

In this example, the first small chamber 210a and the second small chamber 210b are diagonal to each other within the housing 200. In addition, the third small chamber 310a and the fourth small chamber 310b are arranged in a diagonal position different from that of the first small chamber 210a and the second small chamber 210b in the housing 200.

The first small chamber 210a in this example is defined as a region surrounded by the partition 402, the partition 460, the clearance 490, and the first inner wall 202 and the fourth inner wall 208 of the housing 200. The second small chamber 210b is defined as a region surrounded by the partition 404, the partition 470, the clearance 490, and the second inner wall 204 and the third inner wall 206 of the housing 200. The third small chamber 310a is defined as a region surrounded by the partition 402, the partition 470, and the inner surfaces of the housing 200. The fourth small chamber 310b is defined as a region surrounded by the partition 404, the partition 460, and the inner surfaces of the housing 200.

Openings 414, 424 are provided respectively through the partitions 402, 404, 460, 470, respectively in a position separating the first small chamber 210a and the third small chamber 310a, and a position separating the second small chamber 210b and the fourth small chamber 310b. In this example, the openings 414, 424 are provided through the partition 402 and the partition 404. The openings 414, 424 of the present example may have the same shape as each other.

The first small chamber 210a and the second small chamber 210b are filled with a first liquid. The first small chamber 210a and the second small chamber 210b are linked to each other. The third small chamber 310a and the fourth small chamber 310b are filled with a second liquid. The third small chamber 310a and the fourth small chamber 310b are linked to each other.

Either a set of the first small chamber 210a and the second small chamber 210b, or a set of the third small chamber 310a and the fourth small chamber 310b are linked inside the housing 200, and the other set is linked through a conduit provided externally to the housing 200. In this example, the first small chamber 210a and the second small chamber 210b are linked through the clearance 490, and the third small chamber 310a and the fourth small chamber 310b are linked by a conduit 480 provided externally to the housing 200. It is possible to link the first small chamber 210a and the second small chamber 210b by the conduit 480, and the third small chamber 310a and the fourth small chamber 310b through the clearance 490. The conduit 480 is arranged so as not to overlap with the window 230 or with the window 330.

The pressure control section 500 is connected to one of the first to fourth small chambers. The pressure control section 500 may be connected to one of the small chambers linked through the clearance 490, or may be connected to one of the small chambers linked through the conduit 480. In this example, the pressure control section 500 is connected to the fourth small chamber 310b, and controls the pressure of the second liquid. This means that the pressure control section 500 controls the pressure of the liquid inside the fourth small chamber 310b, thereby simultaneously controlling the liquid inside the third small chamber 310a linked with the fourth small chamber 310b.

By simultaneously controlling the pressure of the liquids in the third small chamber 310a and the fourth small chamber 310b, the lens characteristics such as curvature of the first liquid lens 410 and the second liquid lens 420 can be simultaneously controlled.

Figure 5:
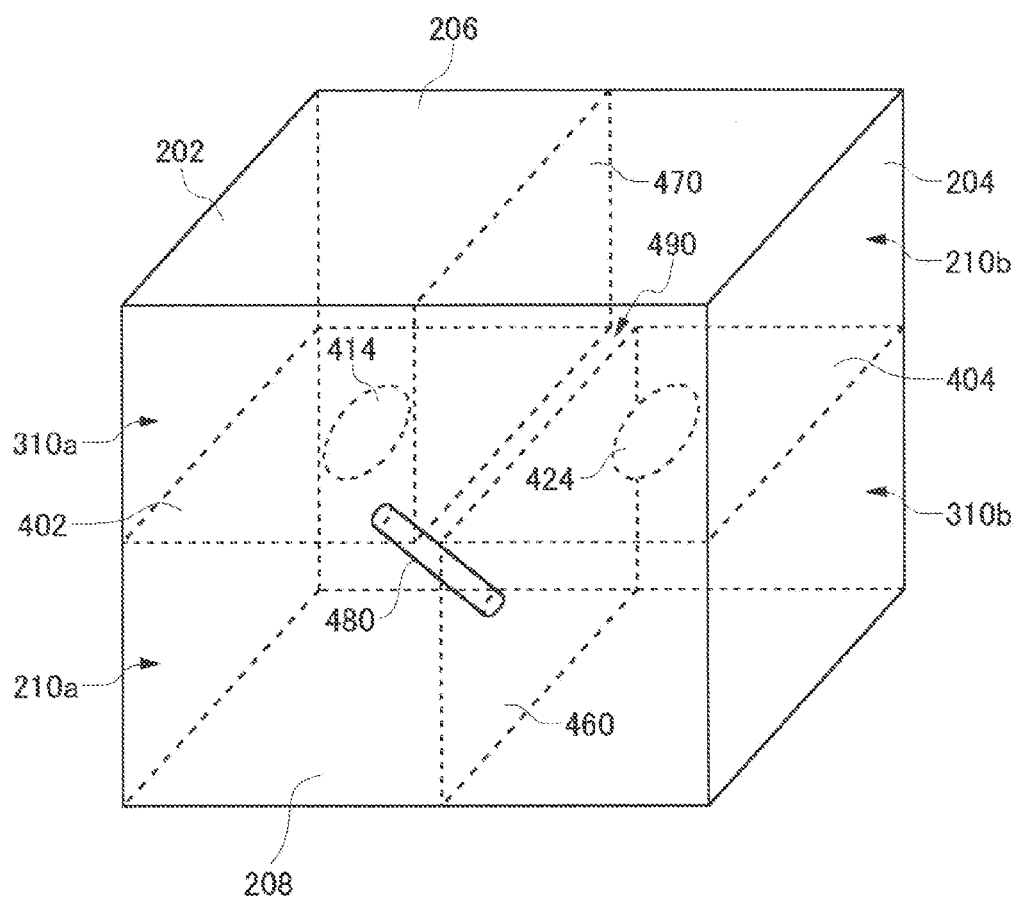
FIG. 5 is a perspective view of a housing 200 in the lens apparatus 600.

FIG. 5 is a perspective view of a housing 200 in the lens apparatus 600. Note that the window 230a, the window 330a, the opening 240, the first liquid lens 410, and the second liquid lens 420 are omitted in FIG. 5. The internal structure of the housing 200 is shown by a dotted line. The first small chamber 210a and the second small chamber 210b are linked to each other so that the first liquid therein can move therebetween. Likewise, the third small chamber 310a and the fourth small chamber 310b are linked to each other so that the second liquid therein can move therebetween.

As described above, the housing 200 includes the first partition 402, the second partition 404, the third partition 460, the fourth partition 470. The first partition 402 separates between the first small chamber 210a and the third small chamber 310a. The second partition 404 separates between the second small chamber 210a and the fourth small chamber 310b.

The third partition 460 separates between the first small chamber 210a and the fourth small chamber 310b. The fourth partition 470 separates between the second small chamber 210b and the third small chamber 310a. As already mentioned, the third partition 460 is linked with the second partition 404. Accordingly, the fourth small chamber 310b can be separated from the first small chamber 210a and from the second small chamber 210b.

The fourth partition 470 is linked with the first partition 402. Accordingly, the third small chamber 310a is separated from the first small chamber 210a and from the second small chamber 210b. In addition, a clearance 490, which links the first small chamber 210a to the second small chamber 210b, is formed between the connection region between the third partition 460 and the second partition 404 and the connection region between the fourth partition 470 and the first partition 402.

As a concrete example, the first partition 402 and the second partition 404 are provided to substantially halve the inside of the housing 200 in the vertical direction. Also as shown in FIG. 4 and FIG. 5, the first partition 402 and the second partition 404 may be displaced in the vertical direction by the amount corresponding to the width of the clearance 490. For example, the first partition 402 and the second partition 404 may be arranged so that the position of the lower surface of the first partition 402 in the height direction may substantially match the position of the upper surface of the second partition 404 in the height direction. In other words, the first partition 402 and the second partition 404 may be provided in such a manner that the first liquid lens 410 and the second liquid lens 420 are provided at the same position in the height direction.

The third partition 460 and the fourth partition 470 are provided to substantially halve the inside of the housing 200 between the left and the right. As shown in FIG. 4 and FIG. 5, the third partition 460 and the fourth partition 470 may be provided in the same position in the horizontal direction. The partition 402, which is one of the partitions extending in the horizontal direction, is linked to the partition 460, which is one of the partitions extending in the vertical direction. The other partition 404 extending in the horizontal direction is linked to the other partition 470 extending in the vertical direction. As a result, a clearance 490 is formed.

Specifically, each of the first partition 402 and the second partition 404 has a shape substantially equal to the cut plane obtained by halving the sectional plane obtained by cutting the inside of the housing 200 in the horizontal plane, by a straight line in the depth direction that is orthogonal to both of the horizontal direction and the vertical direction. Each of the first partition 402 and the second partition 404 may be smaller than this cut plane by a width corresponding to the clearance 490. Here, the horizontal plane is a plane including both of the horizontal direction and the depth direction.

Each of the third partition 460 and the fourth partition 470 has a shape substantially equal to the cut plane obtained by halving the sectional plane obtained by cutting the inside of the housing 200 in the vertical plane, by a straight line in the depth direction. Each of the third partition 460 and the fourth partition 470 may be smaller than this cut plane by a width corresponding to the clearance 490. Here, the vertical plane is a plane including both of the vertical direction and the depth direction.

The clearance 490 is formed along the depth direction from the center both in the vertical and horizontal directions inside the housing 200. The first partition 402 is formed to extend up to the clearance 490 from one of the first exterior walls 300. The second partition 404 is formed to extend up to the clearance 490 from one of the first exterior walls 300 that is opposite to the first exterior wall 300 from which the first partition 402 extends. The third partition 460 is formed to extend up to the clearance 490 from the third exterior wall 220. The fourth partition 470 is formed to extend up to the clearance 490 from the second exterior wall 320.

The conduit 480 in the present example links the third small chamber 310a and the fourth small chamber 310b. The conduit 480 has a tube-like cavity therein, to move the second liquid between the third small chamber 310a and the fourth small chamber 310b. It is preferable to form the conduit 480 without creating any clearance with respect to the housing 200.

The conduit 480 preferably connects the third small chamber 310a and the fourth small chamber 310b by the shortest distance possible, while satisfying the condition that the conduit 480 does not overlap with the window 230 or with the window 330. The conduit 480 may be provided along the first exterior wall 300 on which no window 230 or window 330 is provided. Preferably, the conduit 480 may be provided on a surface of the first exterior wall 300 whose normal direction runs in the depth direction (i.e., the direction in which the clearance 490 extends). Since the mentioned surface of the first exterior wall 300 is in contact with all the small chambers, all the small chambers can be linked in any combination by providing the conduit 480 on the mentioned surface.

As described above, the first small chamber 210a and the second small chamber 210b are linked to each other via the clearance 490 inside the housing 200. The first liquid can flow between the first small chamber 210a and the second small chamber 210b via the clearance 490. The second liquid can flow between the third small chamber 310a and the fourth small chamber 310b via the conduit 480.

The first partition 402 has a first opening 414 between the first small chamber 210a and the third small chamber 310a. In the first opening 414, the first liquid and the second liquid do not mix with each other, and the first liquid lens 410 is formed on their interface.

The second partition 404 includes a second opening 424 between the second small chamber 210b and the fourth small chamber 310b. In the second opening 424, the first liquid and the second liquid do not mix with each other, and the second liquid lens 420 is formed on their interface.

The positional relation between the first liquid and the second liquid in the first opening 414 is reversed to the positional relation between the first liquid and the second liquid in the second opening 424. Therefore, one of the first liquid lens 410 and the second liquid lens 420 becomes a convex lens that bulges out upward and the other becomes a convex lens that bulges out downward. That is, the first liquid lens 410 and the second liquid lens 420 different from each other in lens characteristics are formed in the first opening 414 and the second opening 424. Note that the opening area may be substantially the same between the first opening 414 and the second opening 424 in this example. In addition, the opening shape of the first opening 414 may be the same as the opening shape of the second opening 424. This means that the focal length of the first liquid lens 410 may be substantially the same as the focal length of the second liquid lens 420. Note that the area of the first opening 414 may be different from the area of the second opening 424.

The present example has dealt with the housing 200 that includes two openings. However, not limited to this, the opening 200 may include more openings. In such a case, the housing 200 includes a plurality of small chambers separating the chamber 210 and the chamber 310 according to each opening. By adopting such a structure, it is possible to form an array of liquid lenses functioning as concave lenses and convex lenses. Which of a concave lens or a convex lens each liquid lens functions is determined by a concrete way of linking the small chambers.

Figure 6:
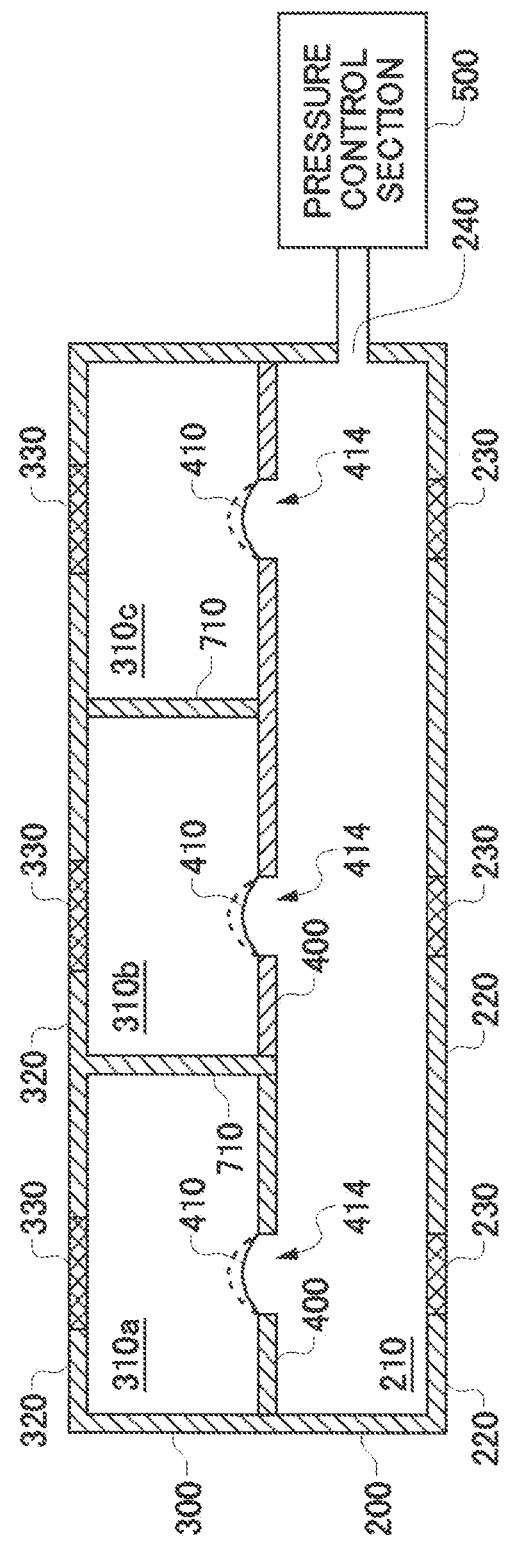
FIG. 6 shows a lens apparatus 700 according to the third embodiment.

FIG. 6 shows a lens apparatus 700 according to the third embodiment. The members having the same function as those of the first embodiment are assigned the same reference numerals, and their explanation is omitted in the following. The housing 200 of the lens apparatus 700 is divided into three or more small chambers 310, corresponding to the three or more openings. In this example, the chamber 310 is divided into small chambers 310a, 310b, and 310c, whereas the chamber 210 is provided common to the plurality of small chambers 310a, 310b, 310c.

Liquids respectively different in characteristics are filled in the small chambers 310a, 310b, 310c. For example, liquids respectively different in refractive indices are filled in the small chambers 310a, 310b, 310c.

In the housing 200, a plurality of partitions 710 are provided to separate the plurality of small chambers 310a, 310b, 310c. Each partition 710 is used to isolate the small chambers 310a, 310b, 310c so that the liquid cannot move thereamong. Each partition 710 has substantially the same shape as the cross section of the chamber 310 when the chamber 310 is cut in the vertical plane including both of the vertical direction and the depth direction. Each partition 710 is provided between the partition 400 and the second exterior wall 320 in the horizontal direction with a predetermined interval therebetween.

Accordingly, the chamber 310 is divided into the plurality of small chambers 310a, 310b, 310c. In addition, openings 414 are provided through the partition 400 within respective small chamber 310a, 310b, 310c. Each opening 414 may have the same opening area and the opening shape.

As described above, liquids having respectively different refractive indices are filled in the small chambers 310a, 310b, 310c, and so the liquid lenses 410 formed in the respective openings 414 will have different lens characteristics from one another. In addition, by controlling the pressure of the first liquid in the chamber 210, the curvatures of the liquid lenses 410 can be collectively changed. According to this configuration, too, the plurality of liquid lenses 410 having different characteristics from each other can be collectively controlled.

Each partition 710 can have a different Young's modulus from each other. In this case, each small chamber 310a, 310b, and 310c may be filled with a liquid of the same characteristics. When the pressure is applied to the small chambers 310a, 310b, 310c through each opening 414, the amount of change in volume will be different for each of the small chambers 310a, 310b, 310c, because of difference in Young's modulus of each partition 710. This enables changing the curvature of each liquid lens 410 for each small chamber.

Figure 7:
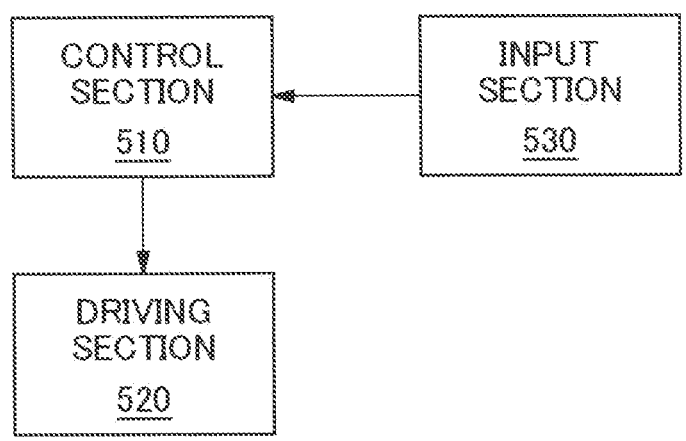
FIG. 7 shows the configuration of a pressure controlling section 500.

FIG. 7 shows a block diagram showing the configuration of a pressure controlling section 500. The pressure control section 500 includes a data input section 530 for inputting data, a control section 510 for receiving a signal from the data input section 530 and generating a driving signal, and a driving section 520 that receives the driving signal and conducts driving.

The data inputted to the input section 530 may be inputted in advance by an operator. The data may be dynamically generated based on the analysis of an image obtained by the liquid lens. The control section 510 may control the operation of the driving section 520 by transmitting a driving signal to the driving section 520. The driving section 520 is driven based on the received driving control signal, and changes the pressure or the volume of the first liquid in the chamber 210. The driving section 520 may be a piezoelectric element that changes its shape according to the voltages applied. For example, the piezoelectric element may be a piezo element.

The following explains how to control the lens apparatus having a liquid lens. In Step 1, data is inputted to the input section 530. Here, the data may include data on the distance up to the subject, the focal length of the lens, the Young's modulus of the partition, the area of the opening, and the refractive index of the solvent. In Step 2, the data is transmitted to the control section 510, and the control section 510 generates a signal used to control the driving section based on the input data.

In Step 3, the signal is transmitted to the driving section 520, and the driving section 520 drives the driving element based on the signal. The driving element changes the pressure inside the chamber, which in turn changes the focal length of the liquid lens. In Step 4, the analysis result of the image obtained by the liquid lens is fed back to the input section 530 and sent to the control section 510, and a correction signal is generated. In Step 5, the driving section 520 drives the driving element again based on the correction signal.

Figure 8A:
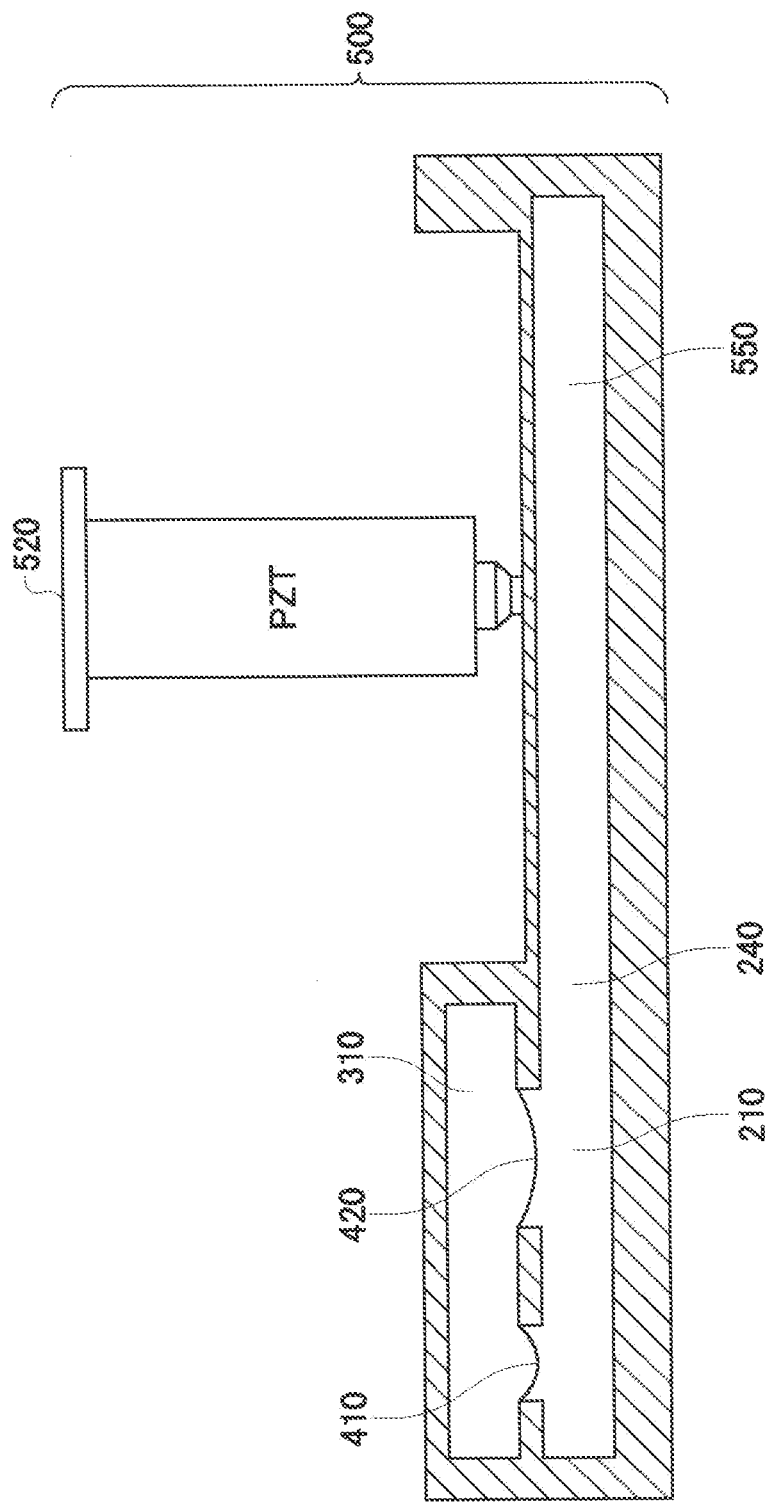
FIG. 8A shows the change caused by a driving section 520 onto the lens characteristics of a liquid lens.
Figure 8B:
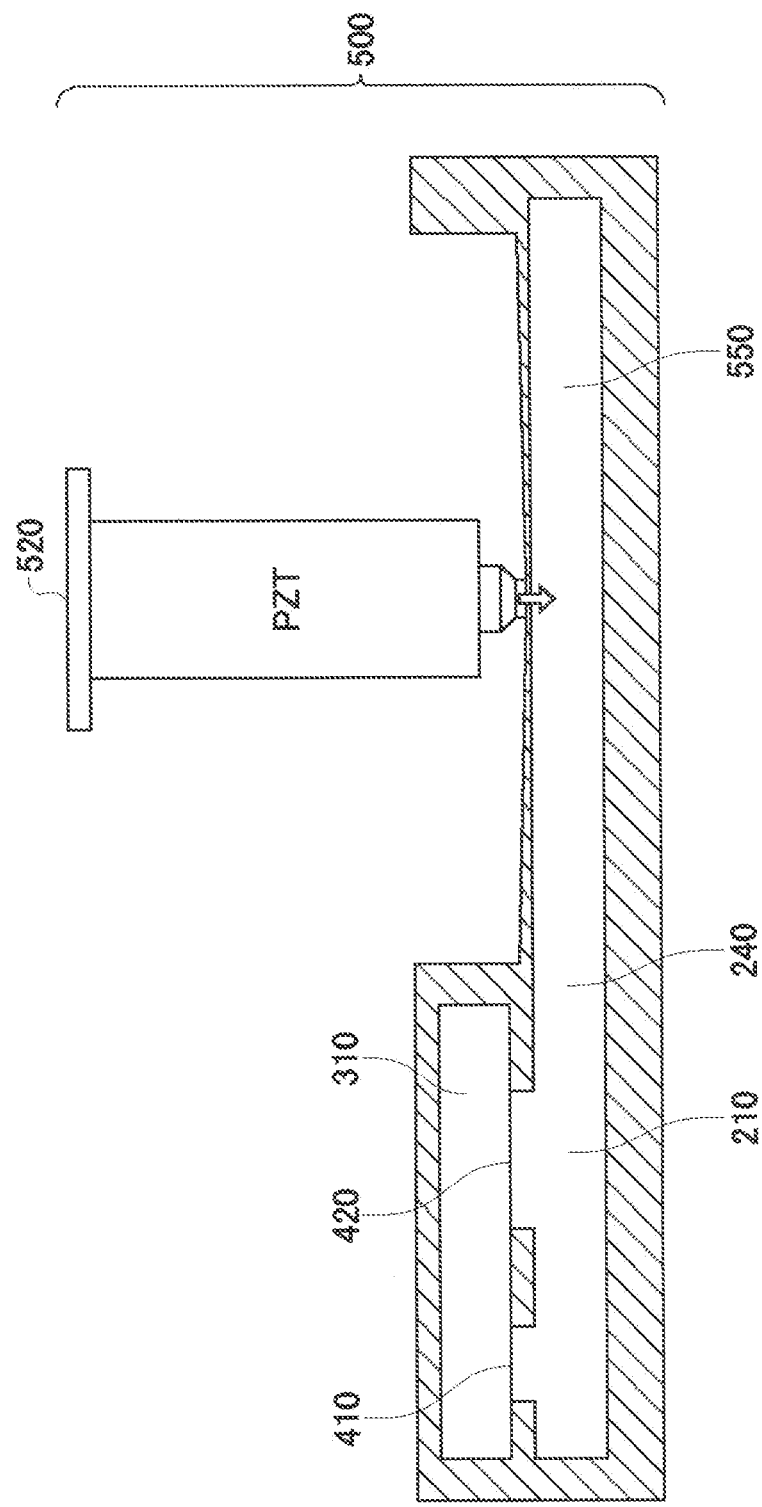
FIG. 8B shows the change caused by the driving section 520 onto the lens characteristics of the liquid lens.
Figure 8C:
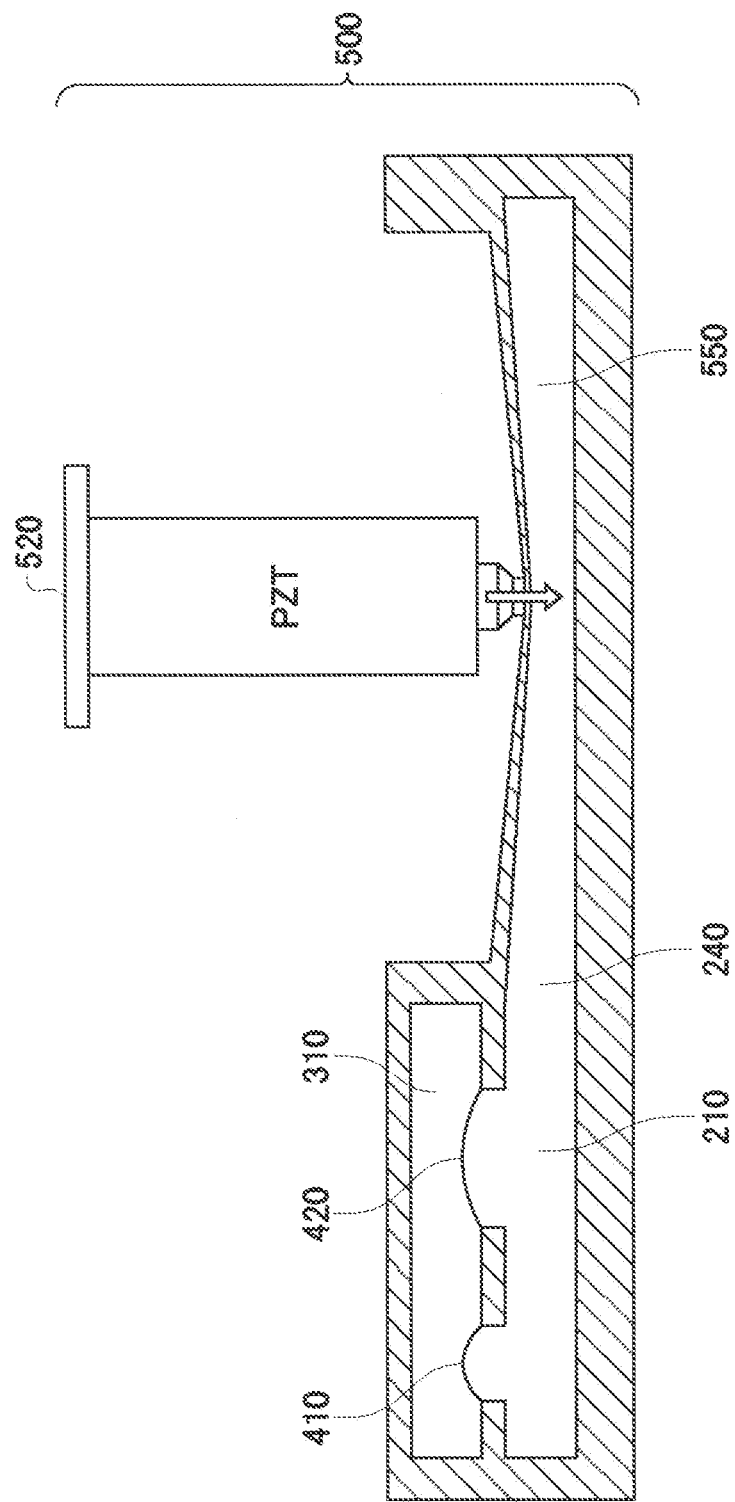
FIG. 8C shows the change caused by the driving section 520 onto the lens characteristics of the liquid lens.

FIG. 8A to FIG. 8C show the configuration examples and the operation examples of the pressure control section 500. The pressure control section 500 includes a driving section 520 and a liquid storage section 550. The driving section 520 may be a piezo actuator that contracts and expands according to the applied voltage, to press the wall of the liquid storage section 550.

The liquid storage section 550 stores therein a first liquid. In the liquid storage section 550, the region in which the first liquid is stored is connected to the chamber 210 through the opening 240. The wall of the region storing the first liquid has sufficient elasticity that can be bent in response to the pressure from the driving section 520.

FIG. 8A shows a state in which no voltage is applied on the driving section 520. In other words, the driving section 520 does not expand or press the wall of the liquid storage section 550. At this time, liquid lenses 410, 420 that are convex downward may be formed on the interface between the second liquid filled in the chamber 310 and the first liquid filled in the chamber 210.

FIG. 8B shows a state in which the driving section 520 presses the wall of the liquid storage section 550 by receiving a voltage. As a result of pressure applied on the wall of the liquid storage section 550, the region of the liquid storage section 550 that can accommodate the first liquid will be narrowed, thereby pressing out the fist liquid from the liquid storage section 550 to the chamber 210. This applies a predetermined first pressure onto the first liquid in the chamber 210. At this stage, the pressure of the first liquid matches the pressure of the second liquid, to flatten the interface between the first liquid and the second liquid.

FIG. 8C shows the state in which the wall of the liquid storage section 550 is bent more by being applied a larger voltage by the driving section 520. At this stage, many more first liquid is pressed out from the liquid storage section 550 toward the chamber 210. This applies a second pressure that is higher than a first pressure onto the first liquid in the chamber 210. At this stage, liquid lenses 410, 420 that are convex upward may be formed on the interface between the first liquid and the second liquid.

Figure 9:
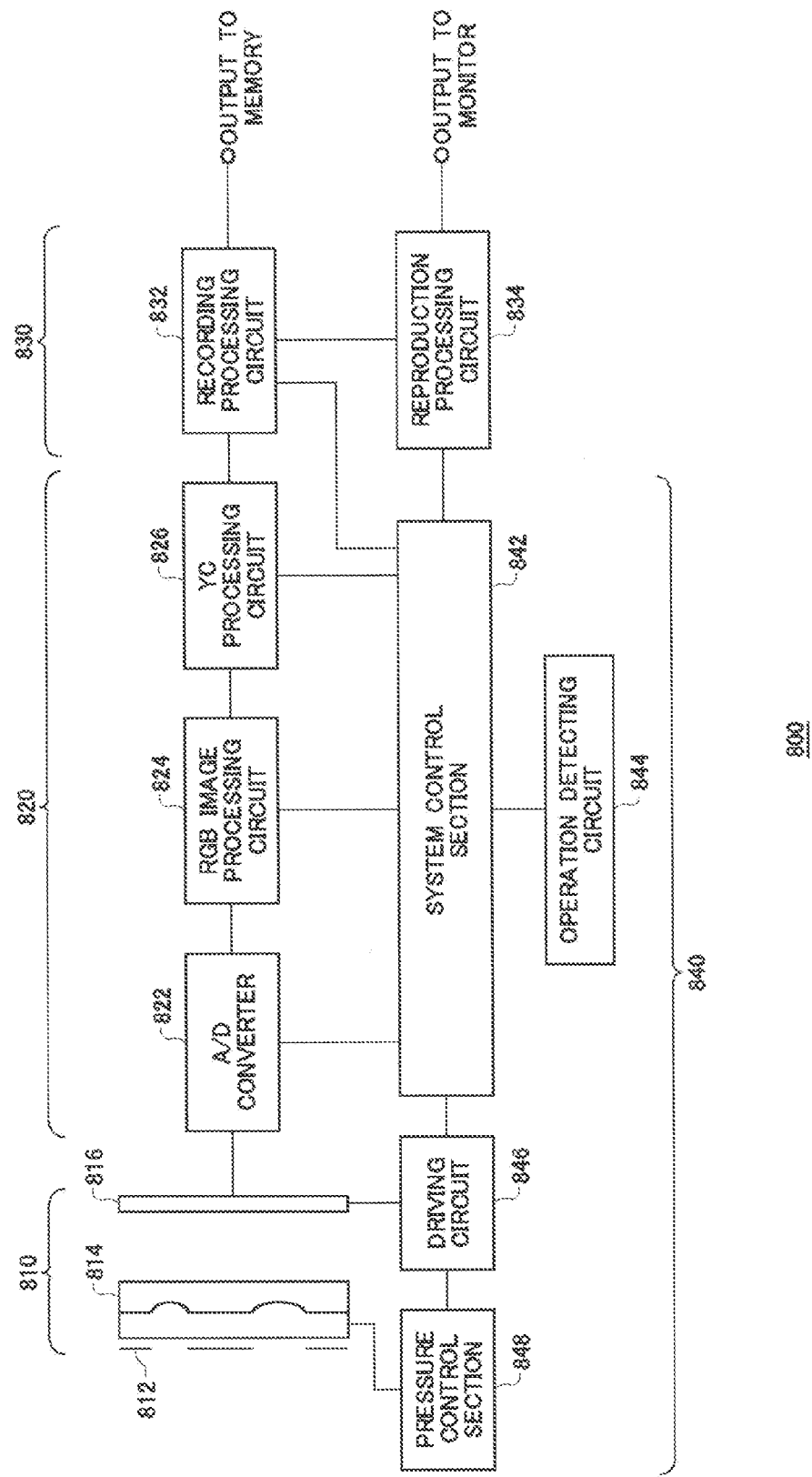
FIG. 9 shows an exemplary functional configuration of an image capturing apparatus 800 according to one embodiment of the present invention.

FIG. 9 shows an exemplary functional configuration of an image capturing apparatus 800 according to one embodiment of the present invention. The image capturing apparatus 800 includes an image capturing system 810, an image processing system 820, a recording reproduction system 830, and a control system 840. The image capturing system 810 includes a diaphragm 812, a lens apparatus 814, and a light receiving section 816. The image processing system 820 includes an A/D converter 822, an RGB image processing circuit 824, and a YC processing circuit 826. The recording reproduction system 830 includes a recording processing circuit 832 and a reproduction processing circuit 834. The control system 840 includes a system control section 842, an operation detecting circuit 844, a driving circuit 846, and a pressure control section 848.

The diaphragm section 812 adjusts the amount of light from the subject transmitted through the lens apparatus 814. The diaphragm section 812 adjusts the amount of light passing through the lens apparatus 814 by adjusting the size of the opening of the diaphragm section 812. In an example, the diaphragm section 812 includes a passage section that passes visible light and infrared light while absorbing and/or reflecting the visible light and the infrared light. Note that the form of the passage section may be round or polygonal.

The lens apparatus 814 forms an image by means of the light from a subject, onto the light receiving section 816. The lens apparatus 814 has the same function and configuration as one of the lens apparatus 100, the lens apparatus 600, and the lens apparatus 700 explained above by referring to FIG. 1 through FIG. 7. The light receiving section 816 includes a plurality of light receiving elements for receiving light from a subject. Note that CCD (charge coupled device) and a plurality of CMOS (complementary metal-oxide semiconductor) sensors are some examples of the light receiving section 816.

In the image capturing system 810, the incident light entered from the image capturing range is received by the light receiving section 816 after passing through the diaphragm section 812 and the lens apparatus 814. The light receiving section 816 receives the light at the plurality of light receiving elements, and captures the image of the subject included in the image capturing range.

The A/D converter 822 reads an analog electric signal from the plurality of light receiving elements of the light receiving section 816. Then, the A/D converter 822 converts the read analog electric signal into a digital signal, and obtains the image of the image capturing region as image capturing data. Specifically, the A/D converter 822 performs processing to alleviate the noise generated in the light receiving section 816 onto the analog electric signal read from the light receiving section 816, to extract the analog electric signal representing the image of the image capturing region captured by the image capturing system 810. The A/D converter 822 corrects the high and low portions of the extracted electric signal to a predetermined level. The A/D converter 822 converts the corrected analog electric signal into a digital signal, to finally obtain the image capturing data.

The RGB image processing circuit 824 processes the image signal received from the light receiving section 816 via the A/D converter 822. The RGB image processing circuit 824 includes a gamma correction circuit. Note that the A/D converter 822 may convert, into a digital signal, the analog electric signal having been gamma-converted by the gamma correction circuit. The A/D converter 822 may convert, into a digital signal, only the RGB components extracted from the analog electric signal.

The RGB image processing circuit 824 includes a white balance circuit. The white balance circuit may be used to perform white balance processing to determine the white reference value of the captured image, if the RGB image processing circuit 824 executes data compression in an attempt to reduce the amount of data that a digital signal has.

Subsequently, the YC processing circuit 826 generates the image of the luminance component and the color difference signal from the RGB signal. The YC processing circuit 826 extracts the portions whose signal change is larger than the predetermined reference value from the captured image, and performs sharpness processing (aperture correction) thereto. Then, the YC processing circuit 826 may perform data compression on the captured image after undergoing the sharpness processing.

The recording processing circuit 832 writes and reads an image signal from the YC processing circuit 826, to and from a memory. The recording processing circuit 832 compresses the YC signal representing a still image and a moving image, in a predetermined compression format. When having read compressed data, the recording processing circuit 832 expands it. The reproduction processing circuit 834 subjects, to matrix conversion, the luminance signal Y and the color difference signal R-Y, B-Y into an RGB signal. The reproduction processing circuit 834 outputs thus converted signal to a monitor.

The system control section 842 controls each operation performed by the A/D converter, the RGB image processing circuit 824, the YC processing circuit 826, the recording processing circuit 832, the operation detecting circuit 844, and the driving circuit 846. The driving circuit 846 generates a driving signal to drive the light receiving section 816 under control by the system control section 842. The driving circuit 846 also generates a driving signal to drive the pressure control section 848 to control the pressure of the liquid in the chamber of the lens apparatus 814.

Although some aspects of the present invention have been described by way of exemplary embodiments, it should be understood that those skilled in the art might make many changes and substitutions without departing from the spirit and the scope of the present invention which is defined only by the appended claims.

The operations, the processes, the steps, or the like in the apparatus, the system, the program, and the method described in the claims, the specification, and the drawings are not necessarily performed in the described order. The operations, the processes, the steps, or the like can be performed in an arbitrary order, unless the output of the former-described processing is used in the later processing. Even when expressions such as "First," or "Next," or the like are used to explain the operational flow in the claims, the specification, or the drawings, they are intended to facilitate the understanding of the invention, and are never intended to show that the described order is mandatory.

What is claimed is:

1. A lens apparatus in which a plurality of lenses are formed, comprising:
   a housing filled with a first liquid and a second liquid that do not mix with each other;
   a partition to divide the inside of the housing into a plurality of regions, each of the regions being filled with one of the first liquid and the second liquid; and
   a pressure control section that controls the internal pressure of the region filled with the first liquid, wherein
   the partition is provided with a plurality of openings, in which a plurality of lenses having different characteristics from each other are formed by means of the interface between the first liquid and the second liquid, and
   the regions inside the housing filled with the first liquid are linked to each other so that the first liquid can move therebetween.

2. The lens apparatus according to claim 1, wherein
   the partition divides the inside of the housing into a first small chamber and a second small chamber linked to each other and filled with the first liquid, and a third small chamber and a fourth small chamber linked to each other and filled with the second liquid,
   the first small chamber is provided to be adjacent to the third small chamber in a first direction,
   the second small chamber is provided to be adjacent to the fourth small chamber in a second direction that is different from the first direction, and
   the partition is provided with an opening in a region thereof that separates the first small chamber from the third small chamber and an opening in a region thereof that separates the second small chamber from the fourth small chamber.

3. The lens apparatus according to claim 2, wherein
   the first direction is reverse to the second direction.

4. The lens apparatus according to claim 3, wherein
   the partition halves the inside of the housing in the horizontal direction and the vertical direction,
   the first small chamber and the second small chamber are provided diagonal to each other inside the housing, and
   the third small chamber and the fourth small chamber are provided diagonal to each other inside the housing.

5. The lens apparatus according to claim 2, wherein
   either a set of the first small chamber and the second small chamber or a set of the third small chamber and the fourth small chamber are linked to each other inside the housing and the other set is linked to each other outside the housing.

6. The lens apparatus according to claim 5, further comprising:
   a conduit provided outside the housing, the conduit linking either the first small chamber to the second small chamber, or the third small chamber to the fourth small chamber.

7. The lens apparatus according to claim 1, wherein
   the partition is provided with a plurality of the openings having respectively different opening areas.

8. The lens apparatus according to claim 7, wherein
   the partition is provided with a plurality of the openings having respectively different dimensions.

9. The lens apparatus according to claim 1, wherein
   the partition divides the region filled with the second liquid inside the housing, into a plurality of small chambers corresponding to the plurality of openings, and the plurality of small chambers are filled with liquids having respectively different characteristics.

10. The lens apparatus according to claim 9, wherein
    the plurality of small chambers are filled with liquids having respectively different refractive indices.

11. The lens apparatus according to claim 9, wherein
    the partition is provided with a plurality of the openings having respectively different opening areas.

12. The lens apparatus according to claim 1, comprising
    a plurality of the partitions to divide the region filled with the second liquid inside the housing, into three or more small chambers corresponding to three or more openings, the plurality of partitions having respectively different Young's modulus.

13. The lens apparatus according to claim 12, wherein the three or more small chambers are filled with liquids having respectively different characteristics.

14. The lens apparatus according to claim 13, wherein the three or more openings have respectively different opening areas.

15. The lens apparatus according to claim 12, wherein the three or more openings have respectively different opening areas.

16. The lens apparatus according to claim 1, wherein the plurality of lenses are different from each other in at least one of the shape of the lens surface, the curvature of the lens surface, and the focal length.

17. The lens apparatus according to claim 1, wherein the pressure control section controls the internal pressure of the region filled with the first liquid by further supplying the first liquid to the region filled with the first liquid.

18. The lens apparatus according to claim 1, wherein the pressure control section controls the internal pressure of the region filled with the first liquid by removing the first liquid from the region filled with the first liquid.

19. The lens apparatus according to claim 1, wherein the pressure control section controls the internal pressure of the region filled with the first liquid by inserting and removing solid matter to and from the region filled with the first liquid.

20. An image capturing apparatus that captures an image via a lens apparatus in which a plurality of lenses are formed, wherein
the lens apparatus includes:
a housing filled with a first liquid and a second liquid that do not mix with each other;
a partition to divide the inside of the housing into a plurality of regions, each of the regions being filled with one of the first liquid and the second liquid; and
a pressure control section that controls the internal pressure of the region filled with the first liquid, wherein
the partition is provided with a plurality of openings, in which a plurality of lenses having different characteristics from each other are formed by means of the interface between the first liquid and the second liquid, and
the regions inside the housing filled with the first liquid are linked to each other so that the first liquid can move therebetween.

* * * * *